(12) United States Patent
Katayanagi

(10) Patent No.: US 6,414,961 B1
(45) Date of Patent: *Jul. 2, 2002

(54) ATM SWITCHING WITH VIRTUAL CIRCUIT FIFO BUFFERS

(75) Inventor: Satoshi Katayanagi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,100

(22) Filed: Jun. 10, 1998

(30) Foreign Application Priority Data

Jun. 10, 1997 (JP) ............................................. 9-152019

(51) Int. Cl.[7] .......................... G06F 13/14; G06F 13/16; G06F 13/20; G06F 13/36
(52) U.S. Cl. .................. 370/395.71; 370/389; 370/412; 370/395.1; 370/395.2; 370/395.7; 710/22; 710/52
(58) Field of Search ................................ 370/395, 235, 370/392, 389, 397, 399, 412, 413, 429, 395.1, 395.2, 395.7, 395.71; 709/212, 249, 250; 710/22, 29, 52, 54, 100

(56) References Cited

U.S. PATENT DOCUMENTS

| | | | | |
|---|---|---|---|---|
| 5,136,584 A | * | 8/1992 | Hedlund | 370/94.1 |
| 5,467,347 A | * | 11/1995 | Petersen | 370/60.1 |
| 5,664,116 A | * | 9/1997 | Gaytan et al. | 395/200.64 |
| 5,689,505 A | * | 11/1997 | Chiussi et al. | 370/388 |
| 5,850,398 A | * | 12/1998 | King, Jr. | 370/412 |
| 5,870,628 A | * | 2/1999 | Chen et al. | 395/842 |
| 5,898,671 A | * | 4/1999 | Hunt et al. | 370/235 |
| 5,941,952 A | * | 8/1999 | Thomas et al. | 709/234 |
| 5,995,995 A | * | 11/1999 | Thomas et al. | 709/100 |
| 6,049,546 A | * | 4/2000 | Ramakrishnan | 370/412 |
| 6,061,354 A | * | 5/2000 | Morikawa et al. | 370/395 |
| 6,295,575 B1 | * | 9/2001 | Blumenau et al. | 711/5 |
| 6,307,857 B1 | * | 10/2001 | Yokoyama et al. | 370/395 |

FOREIGN PATENT DOCUMENTS

| | | |
|---|---|---|
| EP | 0 752 796 | 1/1997 |
| EP | 0 762 797 | 3/1997 |
| JP | 7-221762 | 8/1995 |

OTHER PUBLICATIONS

Hunt, Ray, ATM—protocols and architecture, 1996, Computer Communications 19, Elsevier Science B.V., pp. 597–611.*

Tomimitsu et al.; "An ATM Chip Set for High Performance Computer Interfaces, Affording Over 100 MBPS Sustained Throughput"; IEICE Transactions on Electronics; vol. E78–C, No. 12; Dec. 1, 1995; pp. 1738–1745.

* cited by examiner

Primary Examiner—Hassan Kizou
(74) Attorney, Agent, or Firm—Foley & Lardner

(57) ABSTRACT

In an ATM communication apparatus, when a transmission schedule section determines a transmission virtual channel, payload data corresponding to a plurality of cells is read out from a host memory if no payload for the virtual channel is present in a transmission payload temporarily storing section. The payload corresponding to a first cell, a corresponding cell header, and a corresponding cell trailer are formed into a transmission cell. The cell is transmitted to a physical layer device. Payloads corresponding to the second and subsequent cells are temporarily stored in the transmission payload temporarily storing section. When the transmission schedule section determines the virtual channel as a transmission virtual channel afterward, a payload is read out from the transmission payload temporarily storing section if the payload is stored therein. The read payload, corresponding header information, and corresponding trailer information are formed into a transmission cell. The cell is transmitted to the physical layer device.

5 Claims, 10 Drawing Sheets

ATM SWITCHING WITH VIRTUAL CIRCUIT FIFO BUFFERS

BACKGROUND OF THE INVENTION

1. Field of the Invention

The present invention relates to an ATM communication apparatus and, more particularly, to an ATM communication apparatus having a transmission data temporarily storing circuit for each virtual channel (to be referred to as a "VC" hereinafter).

2. Description of the Prior Art

FIG. 1 is a block diagram showing a conventional ATM communication apparatus. As shown in FIG. 1, the ATM cell formation/transmission section of a conventional ATM communication apparatus 1 is constituted by a transmission schedule section 8 for selecting a VC to be sent next, a cell formation/transmission control section 6 for receiving information indicating the selected VC from the transmission schedule section 8 and controlling cell transmission of the VC, a transmission parameter storage section 7 for storing information (transmission parameters) required to control cell transmission, a transmission cell formation section 9 for forming a transmission cell, and a transmission data FIFO 10 used to store the transmission cell. The ATM reception/split section of the ATM communication apparatus 1 is constituted by a reception/cell split control section 12 for breaking up and filtering a reception cell to reclaim original information, a reception data FIFO 13 for storing the payload of the reception cell after split, a host bus interface section 5 for transmitting/receiving data to/from a host system including a host CPU 2, a host memory 3, and a host bus 4, and a physical layer device interface section 11 for transmitting/receiving an ATM cell to/from a physical layer device.

The ATM communication apparatus 1 is connected to the host memory 3 and the host CPU 2 through the host bus 4. The host memory 3 stores transmission/reception payload data. For example, the host CPU 2 performs upper layer processing for a transmission/reception payload, outputs a transmission request, and manages the host memory.

FIG. 2 shows the format of the transmission parameter storage section 7 (see FIG. 1) in the conventional ATM communication apparatus 1.

As shown in FIG. 2, with respect to one VC, the transmission parameter storage section 7 stores cell header information 31, cell trailer information 32, a payload storage address 33 in the host memory 3 (the host memory payload storage address 33 indicating the start address in the payload storage area in the host memory 3), and a host memory payload capacity 34 (indicating the number of bytes of the payload stored in the continuous area starting from the payload storage address 33). Although FIG. 2 shows only the storage elements (storage portions) for one VC, similar storage portions exist in the transmission parameter storage section 7 for all the remaining VCs.

As shown in FIG. 1, the conventional ATM communication apparatus 1 includes the following signal lines: a VC number signal line 19, a transmission parameter signal line 20, a DMA start request signal line 21, a payload data signal line 25, a header/trailer data signal line 26, and a cell data signal line 27. Each signal line will be described in detail below with reference to FIG. 1.

The VC number signal line 19 is used by the transmission schedule section 8 to notify the cell formation/transmission control section 6 of a VC number upon determining the VC to be sent next. The transmission parameter signal line 20 is used to exchange transmission parameters between the cell formation/transmission control section 6 and the transmission parameter storage section 7.

The DMA start request signal line 21 is used by the cell formation/transmission control section 6 to notify the host bus interface section 5 of a DMA read address and a DMA read data length so as to start DMA transfer. The payload data signal line 25 is used to send the payload data DMA-read by the host bus interface section 5 to the transmission cell formation section 9.

The header/trailer data signal line 26 is used to send the cell header information 31 and the cell trailer information 32 (see FIG. 2), which are read out from the transmission parameter storage section 7 by the cell formation/transmission control section 6 through the transmission parameter signal line 20, to the transmission cell formation section 9. The cell data signal line 27 is used to store the transmission cell formed by the transmission cell formation section 9 in the transmission data FIFO 10.

FIG. 3 is a flow chart showing the operation of the conventional ATM communication apparatus. The operation of the conventional ATM communication apparatus will be described with reference to FIG. 3, together with FIGS. 1 and 2.

In the conventional ATM communication apparatus, when there is a cell to be transmitted next, the transmission schedule section 8 notifies the cell formation/transmission control section 6 of a VC number for the cell to the cell formation/transmission control section 6 through the VC number signal line 19 (step S1 "NOTIFY VC NUMBER").

Upon reception of the notification of this VC number, the cell formation/transmission control section 6 notifies the host bus interface section 5 of the host memory payload storage address 33 stored as a DMA read address in the transmission parameter storage section 7 and 48 bytes (the value indicated by the host memory payload capacity 34 in the case of the last cell) as a DMA read data length through the DMA start request signal line 21. The cell formation/transmission control section 6 then gives the host bus interface section 5 an instruction to DMA-read the transmission payload corresponding to one cell from the host memory 3.

Upon reception of this instruction, the host bus interface section 5 DMA-reads 1-cell data in one bus cycle when transmission payload corresponding to one cell or more is stored in a continuous address area in the host memory 3, and DMA read can be continuously performed in terms of the structure of the host bus 4.

If the transmission payload is distributed in different address areas in the host memory 3, or DMA read cannot be continuously performed in terms of the structure of the host bus 4, 1-cell data is DMA-read in a plurality of bus cycles. The DMA-read transmission payload is sent to the transmission cell formation section 9, in which the payload, the cell header information 31, and the cell trailer information 32 are wrapped into a cell. This cell is stored in the transmission data FIFO 10.

Transmission VCs are selected by the transmission schedule section 8 in units of cells, and the same VC is not necessarily selected for two cells consecutively. For this reason, DMA read of a transmission payload, transmission cell formation, and write of data in the transmission data FIFO 10 are performed in units of cells (step S2 "TRANSFER ONE CELL").

This operation is performed for the following reason. Assume that the transmission schedule section 8 selects a given VC as a transmission VC. In this case, if the payload data of two or more cells corresponding to the VC is stored in the transmission data FIFO 10, the transmission sequence is disturbed when the transmission schedule section 8 selects another VC as the next transmission VC.

The transmission cell stored in the transmission data FIFO 10 is sent to a physical layer device through the physical layer device interface section 11 (step S3 "TRANSMIT ONE CELL").

The following problems (first and second problems) are posed in the above ATM communication apparatus (to be referred to as the prior art hereinafter).

The first problem is poor transfer efficiency on the host bus (see reference numeral 4 in FIG. 1).

This is because, in the prior art, DMA read of transmission data in unit of cells produces an overhead associated with arbitration for bus access and the like for each DMA read. Assume that the ATM communication apparatus master-reads payload data from the host memory through a PCI bus interface. In this case, at least the time corresponding to two clocks is required as the time required for the ATM communication apparatus to gain bus access (i.e., the time required to set a FRAME # signal at LOW by obtaining a GNT # signal after setting a REQ # signal at LOW). In addition, since at least two clocks are required to receive the data of the first word from the host memory after the ATM communication apparatus outputs an address, the overhead become at least 2+2=4 clocks for each DMA read.

In practice, the bus access time tends to be longer. In addition, a waiting time is generally present in the time interval between the instant at which the ATM communication apparatus outputs an address and the instant at which the data of the first word is received from the host memory. In this case, as the PCI bus between the ATM communication apparatus and the host memory is more congested, and the bus access time is longer, or the reception of payload data from the host memory is delayed more, the first problem becomes more conspicuous.

The second problem is a long delay between cell transmission determination and actual transmission. This is because, a DMA read must always be performed after cell transmission determination (transmission VC determination), and a delay corresponding to an overhead for a DMA read inevitably occurs for each cell.

The second problem becomes more conspicuous as the PCI bus between the ATM communication apparatus and the host memory is congested more, and the bus access time is longer, or the reception of payload data from the host memory is delayed more.

SUMMARY OF THE INVENTION

The present invention has been made in consideration of the above situation in the prior art, and has as its object to provide an ATM communication apparatus which can reduce the delay between the instant at which cell transmission is determined and the instant at which a cell is actually transmitted by improving the transfer efficiency of a host bus.

An ATM communication apparatus according to the present invention DMA-reads transmission data corresponding to a plurality of cells into an internal buffer in one bus cycle, and transmits ATM cells by reading out the transmission data from the buffer. More specifically, the ATM communication apparatus incorporates a transmission data temporarily storing section capable of storing/managing transmission data corresponding to a plurality of cells in units of VCs, and a means for DMA,-reading transmission data corresponding to a plurality of cells into the temporarily storing section in one bus cycle.

In order to achieve the above object, according to the principal aspect of the present invention, there is provided an ATM communication apparatus including:

transmission schedule means for determining a virtual channel to be sent;

cell header storage means for storing header information of a transmission cell;

cell trailer storage means for storing trailer information of the transmission cell;

payload read means for reading out payload data from a host memory; and transmission cell formation means for forming the payload data read out from the host memory, the cell header information, and the cell trailer information into a transmission cell, the ATM communication apparatus reading out payload data for a given virtual channel from the host memory, when the transmission schedule means determines transmission for the given virtual channel, forming the payload data, cell header information, and cell trailer information into a transmission cell, and transmitting the cell to a physical layer device, wherein the ATM communication apparatus further comprises:

transmission payload storage means for storing payloads corresponding to a plurality of cells in units of virtual channels;

payload storage location storage means for storing location information of a location in the transmission payload storage means at which each payload is stored; and stored payload count storage means for storing information indicating that payloads currently stored in an area indicated by the payload storage location corresponds to a specific number of cells, when the transmission schedule means determines a transmission virtual channel, payload data corresponding to a plurality of cells is read out from the host memory if no payload for the virtual channel is present in the transmission payload storage means, the payload corresponding to a first cell, a corresponding cell header, and a corresponding cell trailer are formed into a transmission cell, and the cell is transmitted to the physical layer device, while payloads corresponding to second and subsequent cells are temporarily stored in the transmission payload storage means, and when the transmission schedule means determines the virtual channel as a transmission virtual channel afterward, a payload is directly read out from the transmission payload storage means if the payload is stored in the transmission payload storage means, the payload, corresponding header information, and corresponding trailer information are formed into a transmission cell, and the cell is transmitted to the physical layer device.

According to another aspect of the present invention, in the ATM communication apparatus, when the transmission schedule means determines a virtual channel, payload data is newly read out from the host memory and added/stored in the transmission payload storage means even if the number of payloads for the transmission virtual channel which are stored in the transmission payload storage means is not 0 but is not more than a predetermined threshold.

In the ATM communication apparatus according to the present invention, transmission data corresponding to a plurality of cells for a VC to be sent can be DMA-read into the transmission data temporarily storing section in one bus cycle. With respect to the second and subsequent cells, transmission data can be directly read out from the internal buffer without using the host bus.

The present invention therefore has the following effects.

The first effect is improvement in the utilization efficiency of the host bus for the following reason.

According to the present invention, since the ATM communication apparatus incorporates the storage means capable of storing payload data corresponding to a plurality of cells in units of VCs, payload data corresponding to a plurality of cells can be read into the ATM communication apparatus in one bus cycle. This reduces the overhead accompanying data transfer.

Assume that the ATM communication apparatus master-reads payload data from the host memory through a PCI bus interface. In this case, at least a 2-clock time is required as the time required for the ATM communication apparatus to gain bus access (i.e., the time interval between the instant at which the REQ # signal is set at LOW to obtain GNT # and the instant at which the FRAME # signal is output at LOW). In addition, at least 2-clock time is required for the ATM communication apparatus to receive the data of the first word from the host memory after outputting an address. That is, the overhead required corresponds to at least 2+2=4 clocks per DMA read.

Assume that the total time during which payload data corresponding to one cell is output on the bus corresponds to 12 clocks. In the prior art, the time required to read out payload data corresponding to five cells in units of cells corresponds to at least (2+2+12)×5=80 clocks. In the present invention, however, the time required to read out payload data corresponding to five cells in one bus cycle corresponds only 2+2+(12×5)=64 clocks.

In practice, the bus access time is longer than the above time. In addition, a waiting time is generally present in the time interval between the instant at which the ATM communication apparatus outputs an address and the instant at which the data of the first word is received from the host memory. In this case, as the PCI bus between the ATM communication apparatus and the host memory is congested more, and the bus access time is longer, or the reception of payload data from the host memory is delayed more, the effect of improving the utilization efficiency of the host bus in the ATM communication apparatus of the present invention is enhanced.

The second effect is a small delay between the instant at which cell transmission determined and the instant at which a cell is actually transmitted for the following reason.

According to the present invention, the ATM communication apparatus incorporates the storage means capable of storing payload data corresponding to a plurality of cells in units of VCs. Payload data corresponding to the second or subsequent cells is temporarily stored in this storage means. In cell transmission, payloads are read out from the internal storage area without using the bus, thus avoiding a read delay due to the use of the bus.

Consider, for example, a read delay caused when a payload corresponding to one cell is master-read through the PCI bus interface. At least a 2-clock time is required for the ATM communication apparatus to output the FRAME # signal at LOW after GNT # is obtained by setting the REQ " signal at LOW. In addition, since at least a 2-clock time is required for the ATM communication apparatus to receive the data of the first word from the host memory after outputting an address, at least a 4-clock delay occurs.

In contrast to this, in the present invention, a read of 1-cell data from the payload data storage means in the ATM communication apparatus involves no uncertain factors, i.e., bus access time. Even if, therefore, the apparatus is connected like a PCI bus interface, only a known value of two clocks needs to be taken into consideration.

In practice, the bus access time is longer than the above time. In addition, a waiting time is generally present in the time interval between the instant at which the ATM communication apparatus outputs an address and the instant at which the data of the first word is received from the host memory. In this case, as the PCI bus between the ATM communication apparatus and the host memory is congested more, and the bus access time is longer, or the reception of payload data from the host memory is delayed more, a marked delay reducing effect of the ATM communication apparatus of the present invention can be obtained.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF THE PREFERRED EMBODIMENTS

Several preferred embodiments of the present invention will be described in detail below with reference to the accompanying drawings.

Figure 4:
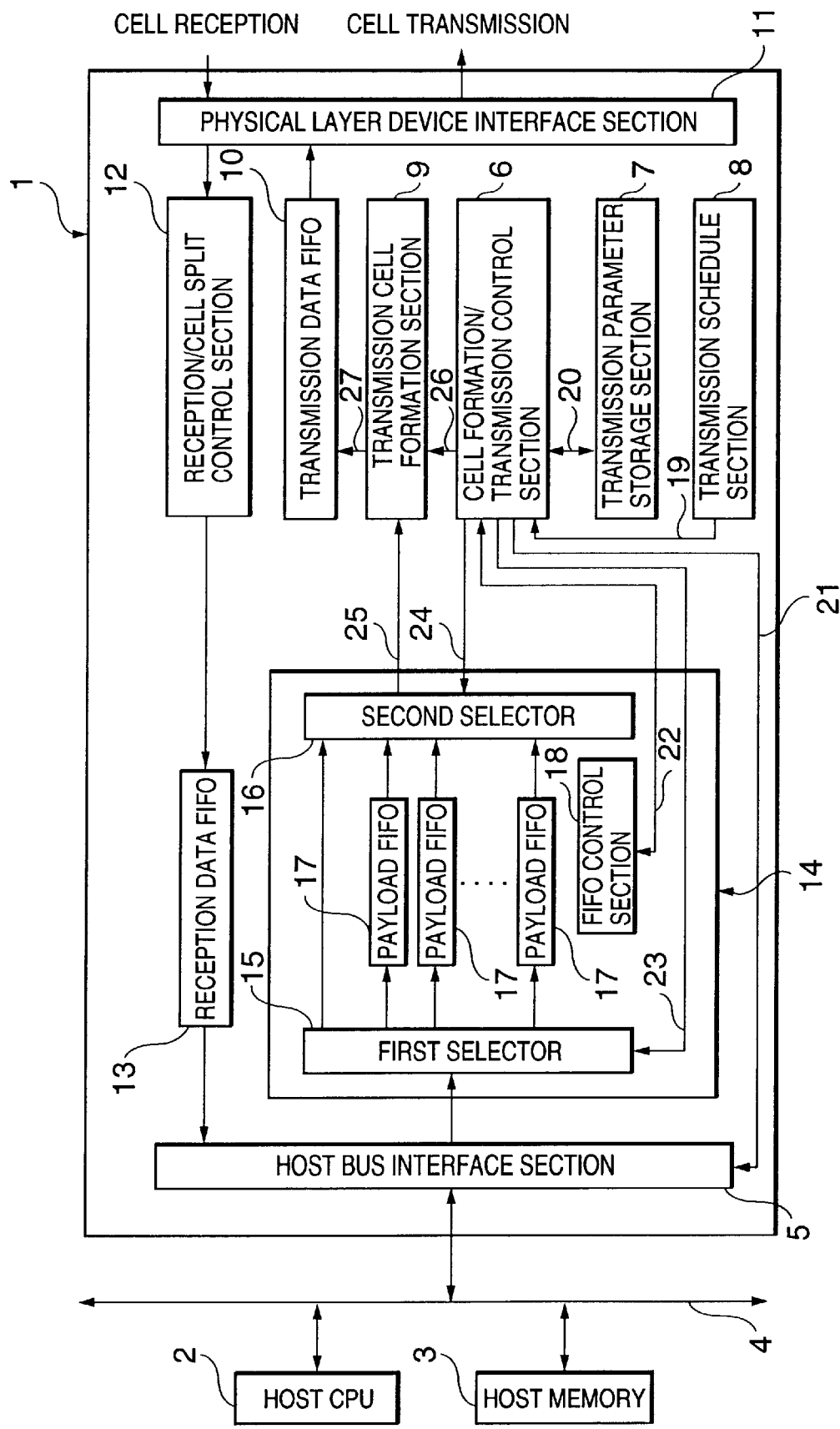
FIG. 4 is a block diagram showing the schematic arrangement of an ATM communication apparatus according to the first embodiment of the present invention.

FIG. 4 is a block diagram showing the arrangement of the first embodiment of the present invention.

Figure 1:
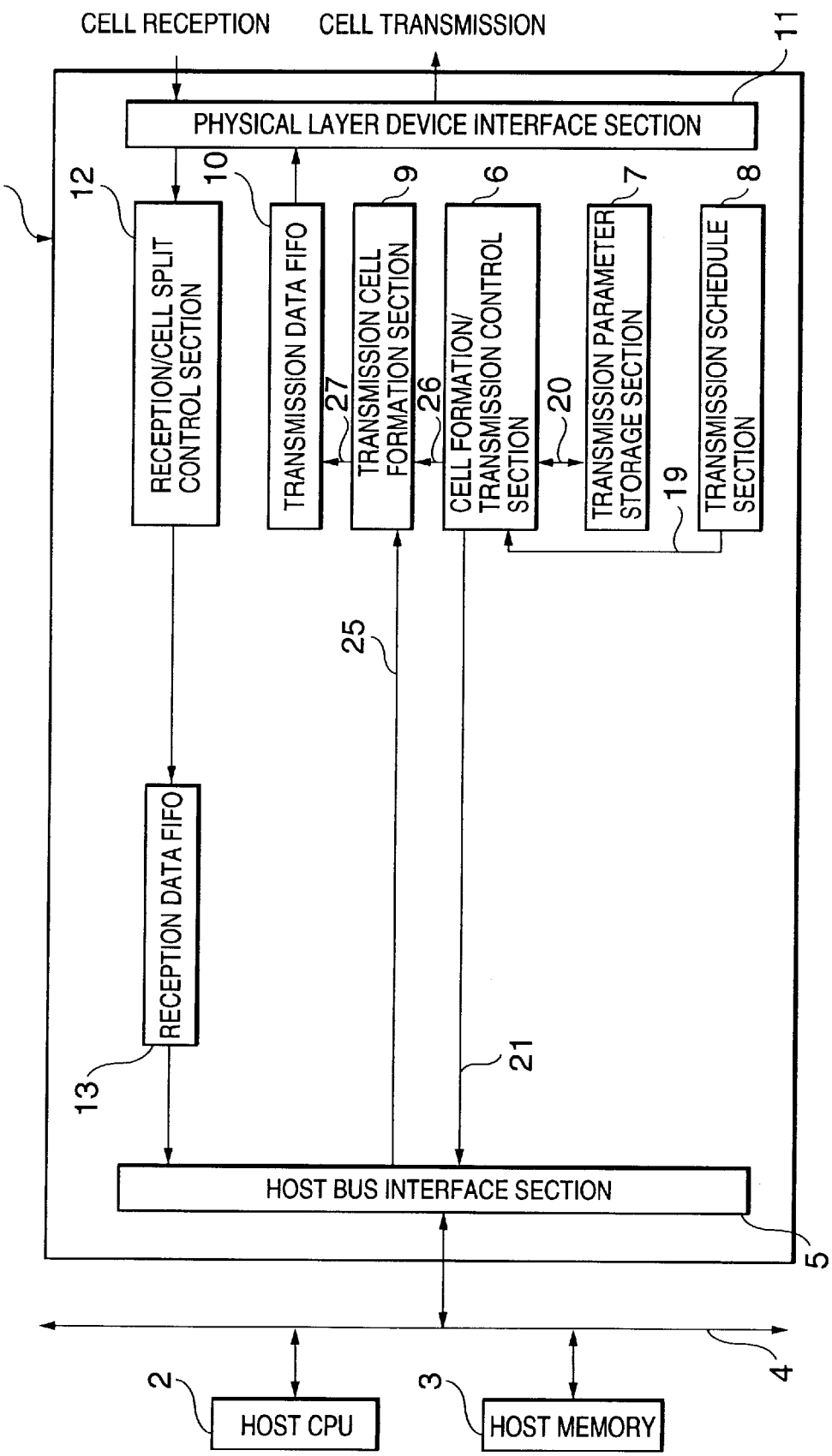
FIG. 1 is a block diagram showing the schematic arrangement of a conventional ATM communication apparatus.
Figure 2:
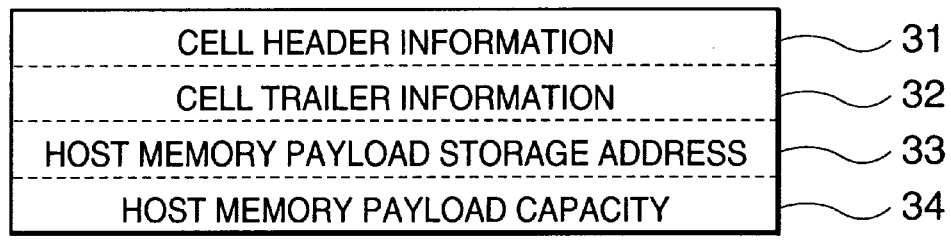
FIG. 2 is a view showing the format of a transmission parameter storage section in the prior art in FIG. 1.
Figure 3:
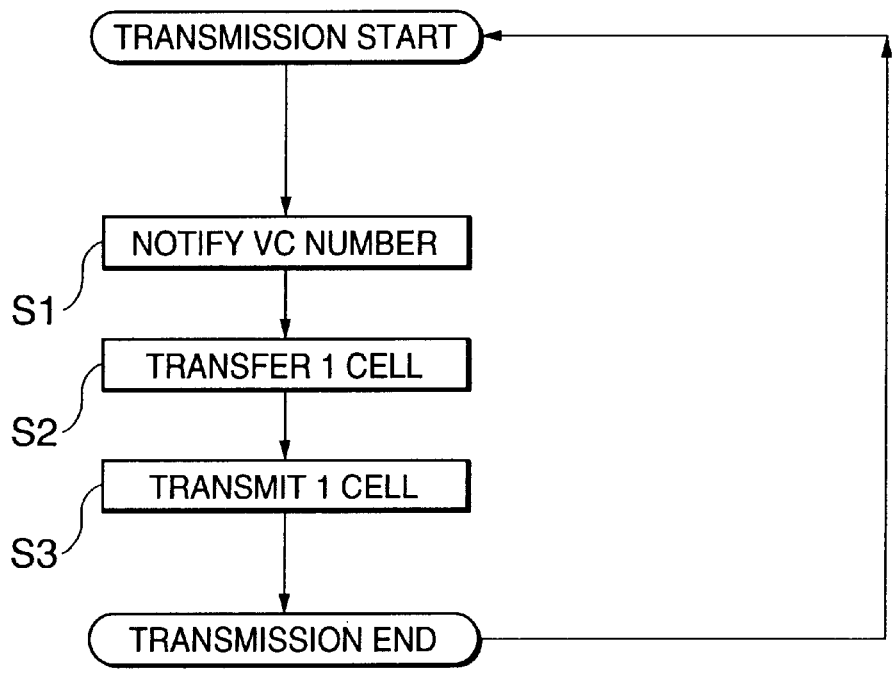
FIG. 3 is a flow chart showing the operation of the prior art in FIG. 1.

As shown in FIG. 4, similar to the conventional ATM communication apparatus (prior art) described with reference to FIG. 1, an ATM communication apparatus 1 according to the first embodiment of the present invention has an ATM cell formation/transmission section constituted by a transmission schedule section 8, a cell formation/transmission control section 6, a transmission parameter storage section 7, a transmission cell formation section 9, and a transmission data FIFO 10. The ATM cell reception/split section of the ATM communication apparatus 1 is constituted by a reception/cell split control section 12, a reception data FIFO 13, a host bus interface section 5 for transmitting/receiving data to/from a host system, and a physical layer device interface section 11 for transmitting/receiving ATM cells to/from a physical layer device.

The ATM communication apparatus 1 according to the first embodiment of the present invention further includes a transmission payload temporarily storing section 14 arranged between the transmission data FIFO 10 and the host bus interface section 5 to store a payload for each VC.

As shown in FIG. 4, the transmission payload temporarily storing section 14 has a plurality of payload FIFOs 17. The respective payload FIFOs 17 are allocated to different VCs. The transmission payload temporarily storing section 14 also has a FIFO control section 18 for allocating FIFOs to VCs and manages the idle payload FIFOs 17 that are allocated to VCs. This section 14 further includes first and second selectors 15 and 16 for controlling the flow of payload data.

The ATM communication apparatus 1 in FIG. 4 is connected to a host CPU 2 and a host memory 3 through a host bus 4.

Figure 5:
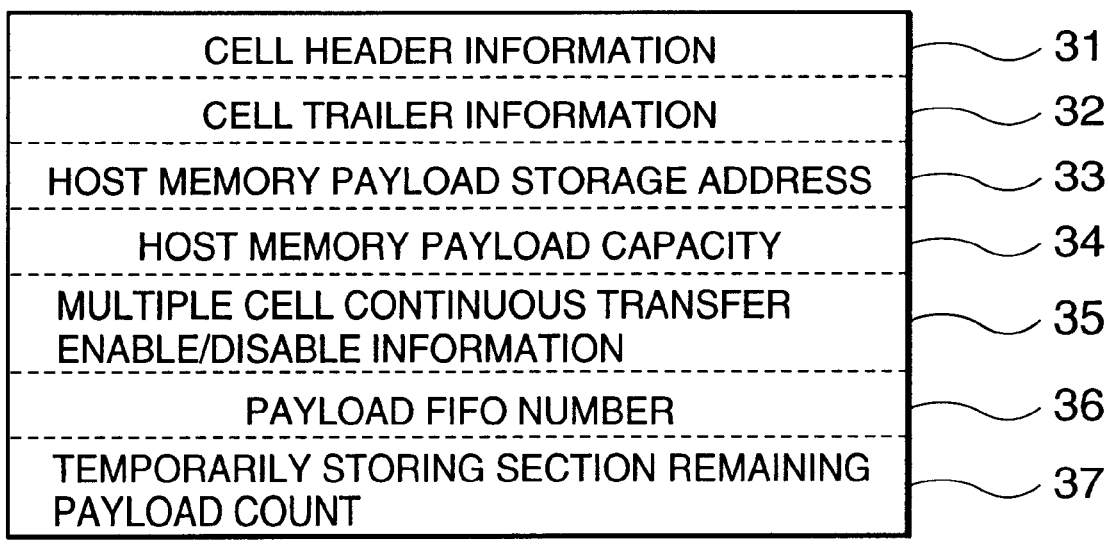
FIG. 5 is a view showing the format of a transmission parameter section in the first embodiment of the present invention.

FIG. 5 shows the format of the transmission parameter storage section 7 in the first embodiment of the present invention. As shown in FIG. 5, with respect to one VC, the transmission parameter storage section 7 stores cell header information 31, cell trailer information 32, host memory payload storage address 33, and host memory payload capacity 34, as in the prior art.

In addition to the above pieces of information, as shown in FIG. 5, the transmission parameter storage section 7 in the first embodiment of the present invention further stores:

multiple cell continuous transfer enable/disable information 35 indicating whether the host CPU 2 is to transfer transmission payloads corresponding to a plurality of cells from the host memory 3 to a corresponding VC at once;

payload FIFO number 36 indicating a specific number of the payload FIFO 17 allocated to the VC; and temporarily storing section remaining payload count 37 indicating the number of cells corresponding to payloads currently left in the payload FIFO 17 indicated by the payload FIFO number 36.

Although FIG. 5 shows only the storage elements (storage portions) for one VC, similar storage portions exist in the transmission parameter storage section 7 for all the remaining VCs.

As in the prior art, the ATM communication apparatus 1 in FIG. 4 includes the following signal lines: a VC number signal line 19, a transmission parameter signal line 20, a DMA start request signal line 21, a payload data signal line 25, a header/trailer data signal line 26, and a cell data signal line 27. The ATM communication apparatus 1 further includes a FIFO control information signal line 22, a select information signal line 23, and a select information signal line 24.

The FIFO control information signal line 22 is used by the cell formation/transmission control section 6 to request the FIFO control section 18 to allocate one payload FIFO 17 to a VC, and is also used by the FIFO control section 18 to notify the cell formation/transmission control section 6 of the number of the payload FIFO 17 allocated to the VC.

The select information signal line 23 is used by the cell formation/transmission control section 6 to notify the first selector 15 of a command for switching the output destination of a payload to another. The select information signal line 24 is used by the cell formation/transmission control section 6 to notify the second selector 16 of a command for switching the output destination of a payload to another.

Figure 6:
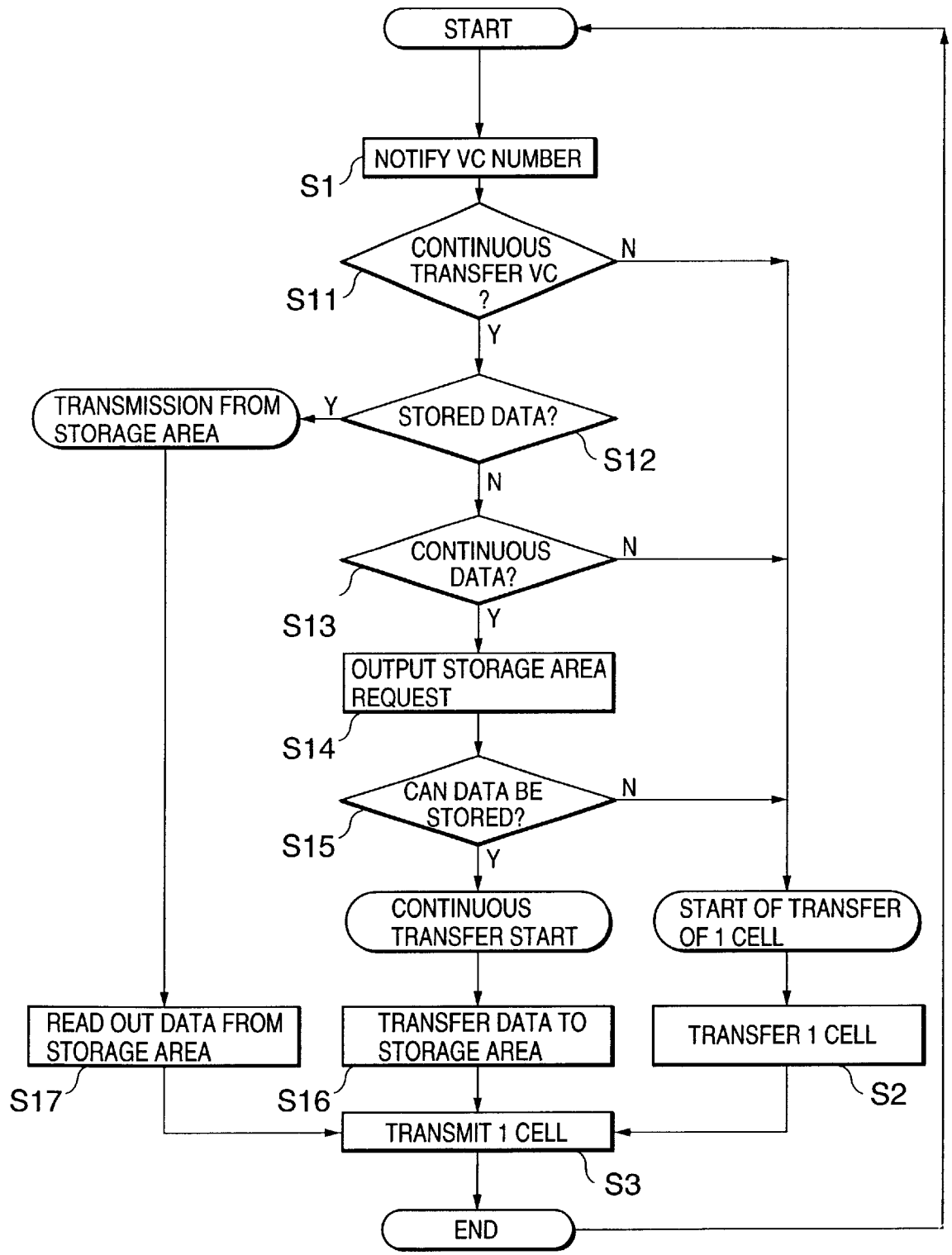
FIG. 6 is a flow chart showing the operation of the first embodiment of the present invention.

FIG. 6 is a flow chart showing the operation of the first embodiment of the present invention. The operation of the first embodiment of the present invention will be described in detail below with reference to FIG. 6, together with FIGS. 4 and 5.

In the ATM communication apparatus 1 according to the first embodiment of the present invention, when there is a cell to be transmitted next, the transmission schedule section 8 notifies the cell formation/transmission control section 6 of the VC number for the transmission of the cell through the VC number signal line 19 (step S1 "NOTIFY VC NUMBER").

Upon reception of the notification of the VC number, the cell formation/transmission control section 6 looks up the multiple cell continuous transfer enable/disable information 35 stored in the transmission parameter storage section 7 to check whether payloads corresponding to a plurality of cells can be continuously transferred to the VC (step S11 "CONTINUOUS TRANSFER VC?")

The multiple cell continuous transfer enable/disable information 35 is determined by the host CPU 2 and set in advance. If the host CPU 2 is not to continuously transfer payloads to the VC, the flow advances to step S2 to DMA-read only a payload corresponding to one cell.

If the host CPU 2 wants to continuously transfer a plurality of payloads to the VC, the cell formation/transmission control section 6 looks up the temporarily storing section remaining payload count 37 stored in the transmission parameter storage section 7 to check whether transmission payloads for the VC have already been stored in the transmission payload temporarily storing section 14 (step S12 "STORED DATA?").

If the payloads are stored, the flow advances to step S17 to read out and transmit a payload corresponding to one cell from the transmission payload temporarily storing section 14.

If no payload is stored, the cell formation/transmission control section 6 looks up the host memory payload capacity 34 stored in the transmission parameter storage section 7 to check whether payloads corresponding to cells for the VC can be DMA-read at once (the number of cells that can be continuously DAM-read) (step S13 "CONTINUOUS DATA?"). If it is determined that payloads corresponding to two cells (96 bytes) or more are not stored in a continuous address area in the host memory 3, the flow advances to step S2 to DMA-read only a payload corresponding to one cell.

If payloads corresponding to two cells or more stored, the cell formation/transmission control section 6 outputs a storage, area ensure request to the FIFO control section 18 through the FIFO control information signal line 22 to ensure a storage area by allocating one payload FIFO 17 in the transmission payload temporarily storing section 14 to this VC. Upon reception of this request, the FIFO control section 18 notifies the cell formation/transmission control section 6 of the number of an idle payload FIFO 17 through the FIFO control information signal line 22. If there is no idle payload FIFO 17, the FIFO control section 18 notifies the cell formation/transmission control section 6 of number 0.

The notified payload FIFO number is stored as the payload FIFO number 36 in the transmission schedule section 8 to be used to read out the payloads from the transmission payload temporarily storing section 14 and send them (step S14 "OUTPUT STORAGE AREA REQUEST").

In step S14, when the allocation of the payload FIFO 17 to the VC is complete, the cell formation/transmission control section 6 checks the payload FIFO number 36 stored in the transmission parameter storage section 7. If the payload FIFO number 36 is not number 0, the cell formation/transmission control section 6 determines that the transmission payloads corresponding to the VC can be stored in the transmission payload temporarily storing section 14. The flow then advances to step S16 to make a continuous DMA transfer of the payloads corresponding to a plurality of cells. If the payload FIFO number 36 is number 0, and no idle payload FIFO 17 is allocated to the VC, the cell formation/transmission control section 6 determines that the payloads cannot be stored in the transmission payload temporarily storing section 14. The flow then advances to step S2 to DMA-read only a payload corresponding to one cell (step S15 "CAN DATA BE STORED?").

In step S15, if the cell formation/transmission control section 6 determines that a continuous DMA, transfer of payloads corresponding to a plurality of cells is to be performed, the section 6 notifies the host bus interface section 5 of the DMA read address and the DMA, read data length through the DMA start request signal line 21, and outputs an instruction to DMA-read the transmission payloads from the host memory 3. At this time, the cell formation/transmission control section 6 notifies the host bus interface section 5 of the host memory payload storage address 33 stored in the transmission parameter storage section 7 as the DMA read address.

In notifying the DMA read data length, the cell formation/transmission control section 6 compares the number of cells which is obtained by subtracting 1 from the number of cells that can be continuously DMA-read, determined in step S13, with the number of cells that can be stored in the payload FIFO (the capacity of the payload FIFO), and notifies of the host bus interface section 5 of the number of cells which is obtained by adding 1 to the smaller number of cells as the number of cells of payloads that can be DMA-read.

The cell formation/transmission control section 6 notifies the first and second selectors 15 and 16 of information indicating that data corresponding to a plurality of cells is to be currently transferred, together with the payload FIFO number 36 as a command, through the select information signal line 23 and the select information signal line 24. The first and second selectors 15 and 16 incorporate command decoders to process this notification as a command.

The first and second selectors 15 and 16 directly send the first 1-cell payload of the DMA-read transmission payloads to the transmission cell formation section 9 by selecting a path avoiding the payload FIFO 17.

For the remaining payloads, the first selector 15 switches its output to a path extending to the payload FIFO 17 designated by the payload FIFO number 36 to store the payloads in the payload FIFO 17 in the transmission payload temporarily storing section 14 (step S16 "TRANSFER PAYLOADS TO STORAGE AREA").

In step S2, as in the prior art, a payload corresponding to one cell is DMA-read. In this case, the cell formation/transmission control section 6 issues commands for bypassing the payload FIFO 17 to the first and second selectors 15 and 16 in the transmission payload temporarily storing section 14 through the select information signal line 23 and the select information signal line 24, thereby directly sending the payload to the transmission cell formation section 9.

If the cell formation/transmission control section 6 determines in step S12 that a payload corresponding to one cell is read out from the transmission payload temporarily storing section 14 to be sent, the section 6 issues a command for switching the input of the second selector 16 to the payload FIFO 17 designated by the payload FIFO number 36, thereby sending the payload from the transmission payload temporarily storing section 14 to the transmission cell formation section 9.

After this, the cell formation/transmission control section 6 subtracts one from the temporarily storing section remaining payload count 37 stored in the transmission parameter storage section 7 (step S17 "READ OUT PAYLOAD FROM STORAGE AREA").

The transmission payload sent to the transmission cell formation section 9, the cell header information 31, and the cell trailer information 32 are formed into a transmission cell. This cell is stored in the transmission data FIFO 10 and sent to the physical layer device through the physical layer device interface section 11 (step S3 "TRANSMIT ONE CELL").

The second embodiment of the present invention will be described next.

Figure 7:
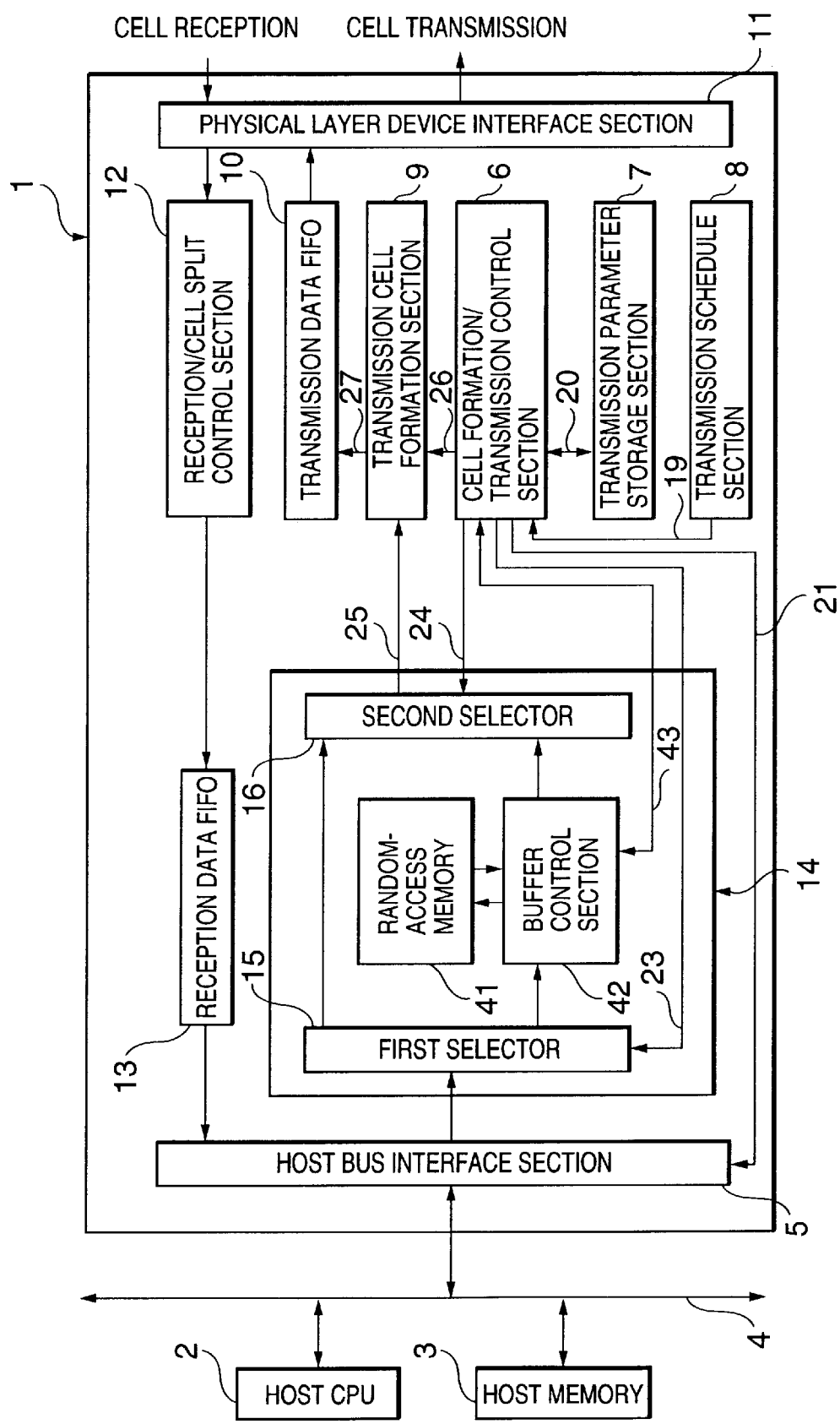
FIG. 7 is a block diagram showing the schematic arrangement of an ATM communication apparatus according to the second embodiment of the present invention.

FIG. 7 is a block diagram showing the arrangement of the second embodiment of the present invention.

In the first embodiment shown in FIG. 4, the payload storage area of the transmission payload temporarily storing section 14 is constituted by the plurality of payload FIFOs 17. In contrast to this, in the second embodiment, a RAM (Random-Access Memory) 41 is used as a payload storage area. This RAM 41 and a buffer control section 42 for managing the RAM 41 constitute a transmission payload temporarily storing section 14. The second embodiment has a buffer control information signal line 43 as a signal line instead of the FIFO control information signal line 22. Since the remaining arrangements are the same as those of the first embodiment, a description thereof will be omitted.

Figure 8:
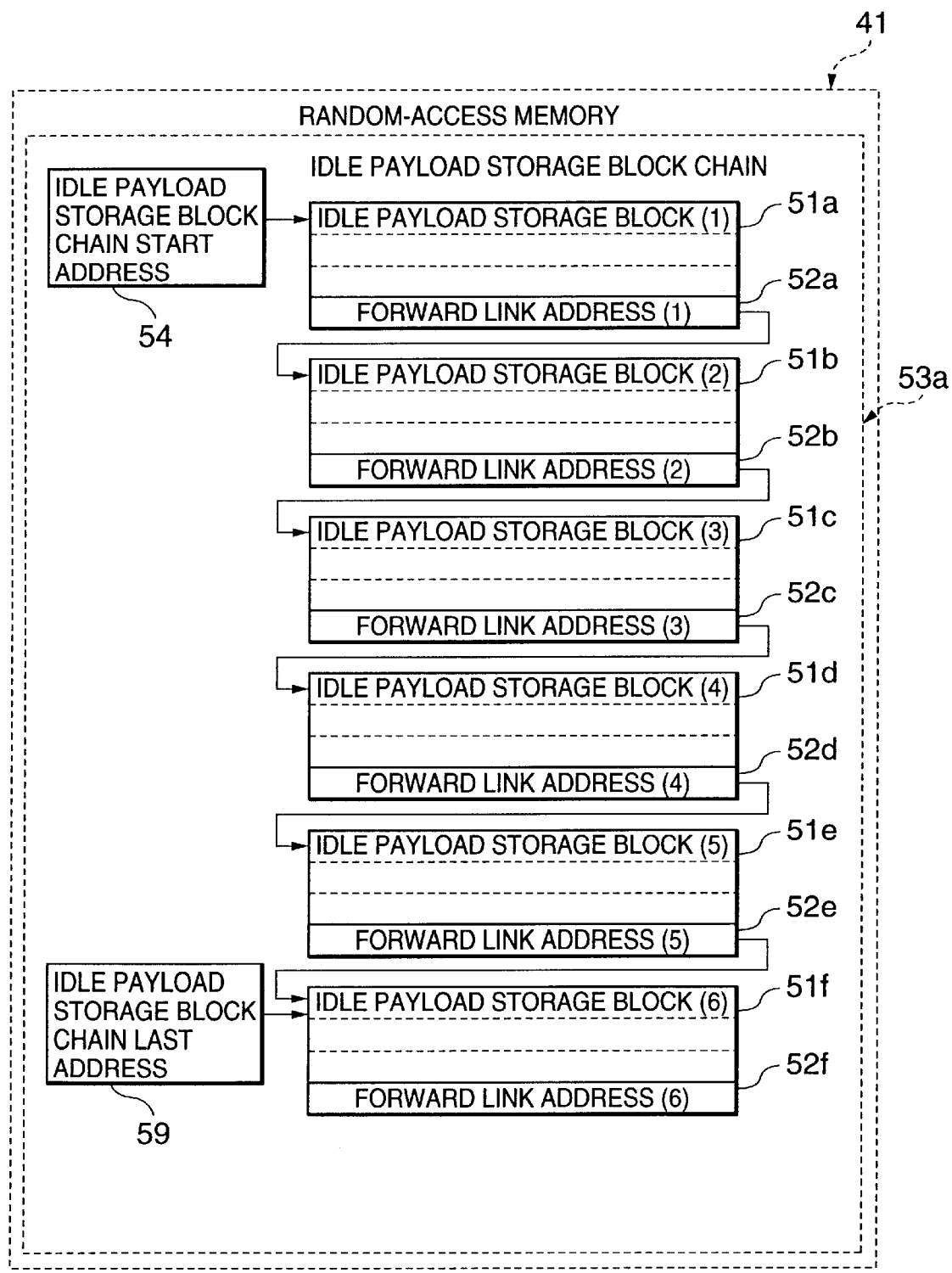
FIG. 8 is a view showing the arrangement of the contents of a random access memory in the second embodiment of the present invention after initialization.

FIG. 8 shows the arrangement of the contents of the RAM 41 after initialization in the second embodiment of the present invention.

As shown in FIG. 8, the entire area of the RAM 41 is divided into idle payload storage blocks having the same structure, i.e., an idle payload storage block (1) 51*a*, an idle payload storage block (2) 51*b*, an idle payload storage block (3) 51*c*, an idle payload storage block (4) 51*d*, an idle payload storage block (5) 51*e*, and an idle payload storage block (6) 51*f*. Note that an area having the same format as that of the idle payload storage block (1) 51*a* will be referred to as a payload storage block hereinafter.

When the respective payload storage blocks are allocated to VCs while having the same size, a transmission payload corresponding to one cell is stored in each payload storage block. Forward link addresses for logically linking a plurality of payload storage blocks to each other are stored in the last portions of all the payload storage blocks. These forward link addresses are used as so-called link pointers.

A forward link address (1) 52*a*, a forward link address (2) 52*b*, a forward link address (3) 52*c*, a forward link address (4) 52*d*, a forward link address (5) 52*e*, and a forward link address (6) 52*f* are respectively stored in the idle payload storage block (1) 51*a*, the idle payload storage block (2) 51*b*, the idle payload storage block (3) 51c, the idle payload storage block (4) 51d, the idle payload storage block (5) 51e, and the idle payload storage block (6) 51f.

The forward link address (1) 52a designates the start address of the idle payload storage block (2) 51b; the forward link address (2) 52b, the start address of the idle payload storage block (3) 51c; the forward link address (3) 52c, the start address of the idle payload storage block (4) 51d; the forward link address (4) 52d, the start address of the idle payload storage block (5) 51e; and the forward link address (6) 52f, the start address of the idle payload storage block (6) 51f, thereby logically linking the idle payload storage block (1) 51a to the idle payload storage block (6) 51f. As a result, an idle payload storage block chain 53a is formed.

The start address of the idle payload storage block (1) 51a as the start payload storage block of the idle payload storage block chain 53a is stored as an idle payload storage block chain start address 54 in the buffer control section 42 to establish a new link.

The start address of the idle payload storage block (6) 51f linked to the end of the idle payload storage block chain 53a is stored as an idle payload storage clock chain last address 59 in the buffer control section 42 to establish a new link.

No payload storage blocks in the RAM 41 are allocated to any VC after initialization.

In transmitting a payload, a payload storage block is extracted from the idle payload storage block chain 53a upon establishment of a new link, and the extracted payload storage block is logically linked by using a forward link address to form a larger payload storage area (payload storage block chain). This area is allocated to a VC to be used as an area for temporarily storing the payload.

Figure 9:
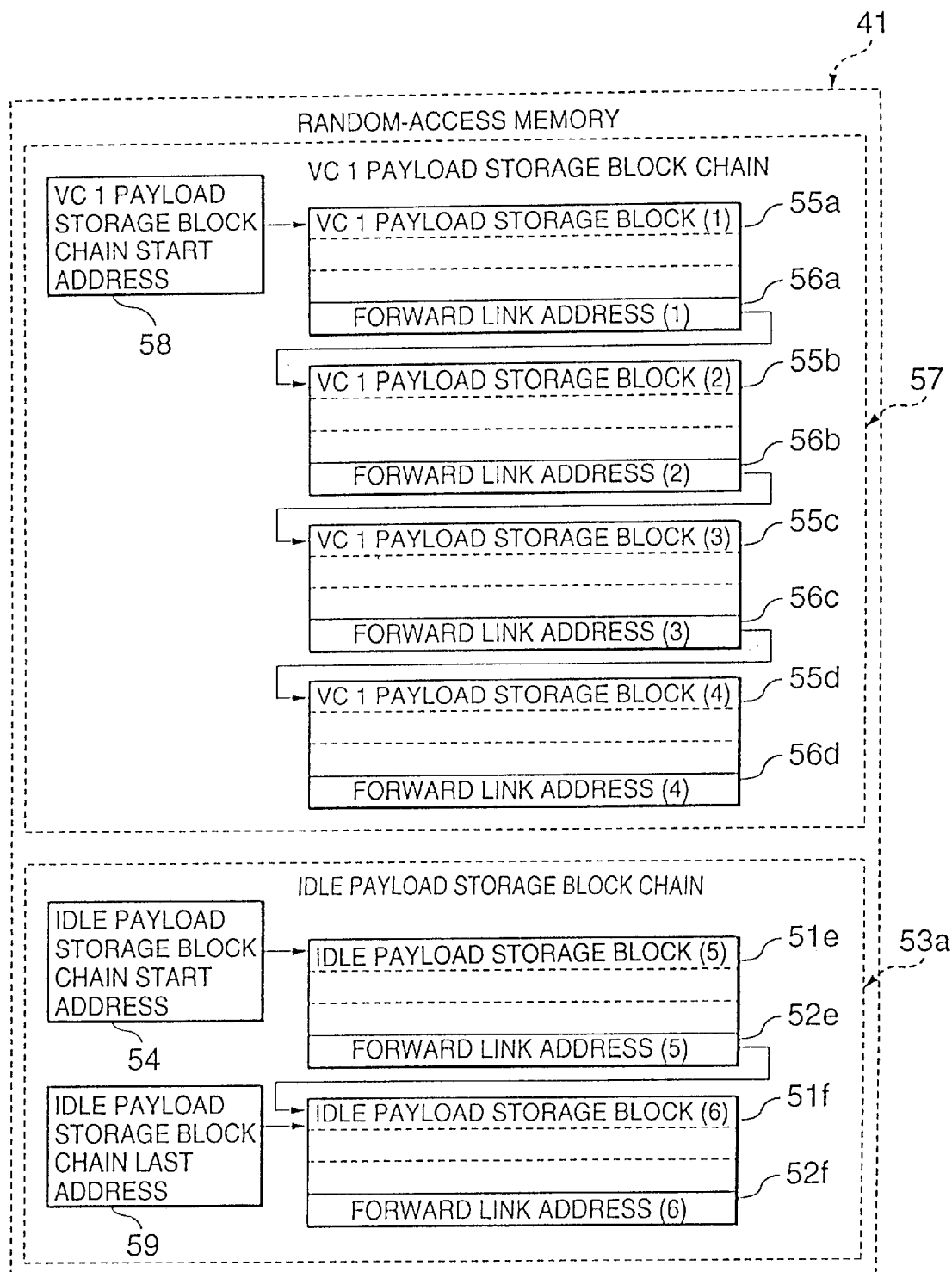
FIG. 9 is a view showing the arrangement of the contents of the random access memory in a case wherein a partial area of the random access memory is allocated to a transmission VC in the second embodiment of the present invention.

FIG. 9 schematically shows the arrangement of the contents of the RAM 41 in a case wherein part of the area is allocated to a transmission VC.

The arrangement of the RAM 41 in a case wherein four payload storage blocks of the idle payload storage block chain 53a are allocated to VC 1 will be described with reference to FIG. 9.

Referring to FIG. 9, the four idle payload storage blocks, the first to fourth blocks, of the idle payload storage block chain 53a, i.e., the idle payload storage block (1) 51a, the idle payload storage block (2) 51b, the idle payload storage block (3) 51c, and the idle payload storage block (4) 51d, are separated from the start of the idle payload storage block chain 53a and are respectively allocated as a VC 1 payload storage block (1) 55a, a VC 1 payload storage block (2) 55b, a VC 1 payload storage block (3) 55c, and a VC 1 payload storage block (4) 55d. These blocks are used as transmission payload storage areas for VC 1.

A forward link address (1) 56a, a forward link address (2) 56b, a forward link address (3) 56c, and a forward link address (4) 56d respectively stored in the VC 1 payload storage block (1) 55a, the VC 1 payload storage block (2) 55b, the VC 1 payload storage block (3) 55c, and the VC 1 payload storage block (4) 55d are held without rewriting the values of the forward link address (1) 52a, the forward link address (2) 52b, the forward link address (3) 52c, and the forward link address (4) 52d shown in FIG. 8. These forward link addresses logically link the VC 1 payload storage block (1) 55a, the VC 1 payload storage block (2) 55b, the VC 1 payload storage block (3) 55c, and the VC 1 payload storage block (4) 55d, thereby forming a VC 1 payload storage block chain 57.

The idle payload storage block chain start address 54 is replaced with the start address of the fifth idle payload storage block from the start of the idle payload storage block chain 53a in FIG. 8, i.e., the start address of the idle payload storage block (5) 51e, thereby forming a new idle payload storage block chain 53b in which the idle payload storage block (5) 51e and the idle payload storage block (6) 51f are logically linked to each other and stored.

The idle payload storage block chain start address 54 before it is replaced is notified to the cell formation/transmission control section 6 and stored in the transmission parameter storage section 7 as a VC 1 payload storage block chain start address 58 indicating the start address of the VC 1 payload storage block chain 57.

Referring to FIG. 9, when a transmission payload is read out from the VC 1 payload storage block (1) 55a, and the VC 1 payload storage block (1) 55a becomes unnecessary, the forward link address (6) 52f of the idle payload storage block (6) 51f linked to the end of the idle payload storage block chain 53b is replaced with the VC 1 payload storage block chain start address 58 designating the start address of the VC 1 payload storage block (1) 55a. The VC 1 payload storage block (1) 55a is then linked to the end of the idle payload storage block chain 53b. As a result, the VC 1 payload storage block (1) 55a is returned to the idle payload storage block chain 53b.

At this time, the idle payload storage clock chain last address 59 is replaced with the address indicated by the VC 1 payload storage block chain start address 58.

Subsequently, the cell formation/transmission control section 6 is notified of the address indicated by the hop destination address (1) as the VC 1 payload storage block chain start address 58, and the address is stored in the transmission parameter storage section 7.

In general, when the same processing as the allocating/returning of the VC 1 payload storage block chain 57 is performed for the remaining VCs, a plurality of payload storage block chains allocated to the respective VCs are present in the RAM 41.

Figure 10:
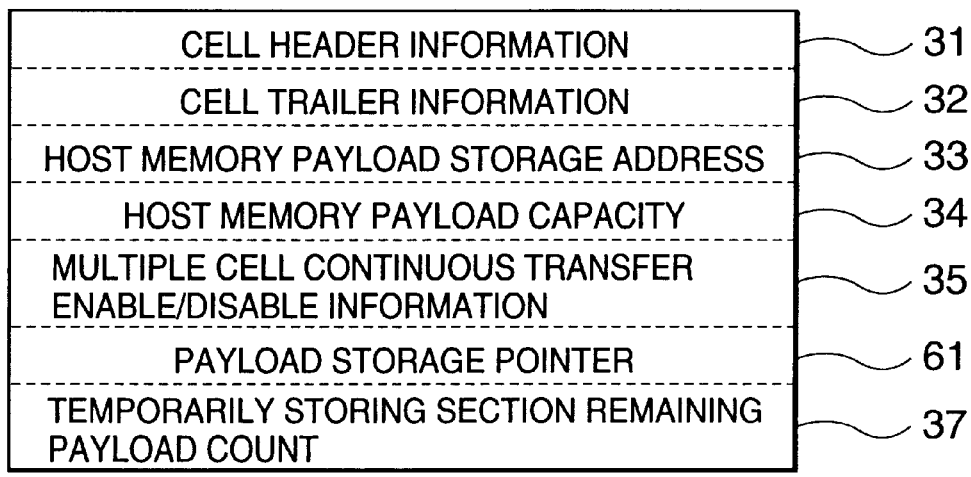
FIG. 10 is a view showing the format of a transmission parameter storage section in the second embodiment of the present invention.

FIG. 10 schematically shows the format of the transmission parameter storage section 7 in the second embodiment of the present invention.

As in the transmission parameter storage section 7 in FIG. 5 in the first embodiment, with respect to one VC, the transmission parameter storage section 7 stores cell header information 31, cell trailer information 32, host memory payload storage address 33, host memory payload capacity 34, multiple cell continuous transfer enable/disable information 35, and temporarily storing section remaining payload count 37.

In the first embodiment, in addition to the above pieces of information, the payload FIFO number 36 indicating the specific number of the payload FIFO 17 allocated to the VC is stored in the transmission parameter storage section 7. In contrast to this, in the second embodiment, since a storage block chain in the RAM 41 is used as a storage area instead of a FIFO, a payload storage pointer 61 indicating the start address of the payload storage block chain in the RAM 41 is stored (see FIG. 10).

More specifically, with respect to VC 1, the VC 1 payload storage block chain start address 58 shown in FIG. 9 is stored in the payload storage pointer 61. Although FIG. 10 shows only the storage elements (storage portions) for one VC, similar storage portions exist in the transmission parameter storage section 7 for all the remaining VCs.

The operation of the second embodiment will be described in detail next with reference to FIGS. 7 to 10, together with FIG. 6.

The operation of the ATM communication apparatus according to the second embodiment is the same as that of the first embodiment shown in FIG. 6 except for steps S14 to S17 and step S2.

In the first embodiment, in step S14, the cell formation/transmission control section 6 allocates one of the payload FIFOs 17 in the transmission payload temporarily storing section 14 to this VC to ensure a storage area for a transmission payload. In the second embodiment, part of an idle payload storage block chain 53 in the RAM 41 is extracted to be ensured as a transmission payload storage area.

Furthermore, in the second embodiment, the cell formation/transmission control section 6 notifies the buffer control section 42 of the number obtained by subtracting one from the number of cells that can be continuously DMA-transferred, which is determined in step S13, through the buffer control information signal line 43, thereby ensuring a storage area. Upon reception of this notification, the buffer control section 42 extracts an idle payload storage blocks 51 corresponding to the requested number of cells from the start of the idle payload storage block chain 53, and notifies the cell formation/transmission control section 6 of the number of payload blocks in the payload storage block chain and the start address thereof through the buffer control information signal line 43.

If the number of idle payload storage blocks is smaller than the requested number, and all the requested number of blocks cannot be prepared as payload storage blocks for the VC, the number of blocks prepared as payload storage blocks is notified. If no payload storage block can be prepared, "0" is notified as the number of payload storage blocks.

The notified payload storage block count and the idle payload storage block chain start address are stored as the temporarily storing section remaining payload count 37 and the payload storage pointer 61 in a transmission parameter storage section 7. The buffer control section 42 has a counter to manage the number of idle payload storage blocks.

A payload storage block chain is extracted by establishing a new idle payload storage block chain link.

More specifically, in the arrangement of the RAM 41 in FIG. 8, when four payload storage blocks are requested for VC 1, the buffer control section 42 notifies the cell formation/transmission control section 6 of the current idle payload storage block chain start address 54 as the VC 1 payload storage block chain start address 58 in FIG. 9 through the buffer control information signal line 43. The cell formation/transmission control section 6 then stores, in the buffer control section 42, the forward link address (4) 52d stored in the fourth idle payload storage block (4) 51d from the start of the idle payload storage block chain as the new idle payload storage block chain start address 54. With the above operation, the payload storage block chain for VC 1 is extracted, and the RAM 41 has the arrangement shown in FIG. 9 (step S14).

When the payload storage block chain is allocated to the VC in step S14, the cell formation/transmission control section 6 looks up the temporarily storing section remaining payload count 37 (the number of payload storage blocks ensured for the VC in step S14). If the temporarily storing section remaining payload count 37 is not 0, the cell formation/transmission control section 6 determines that payload data for the VC can be stored in the transmission payload temporarily storing section 14. The flow then advances to step S16 to make a continuous DMA transfer of payloads corresponding to a plurality of cells.

If the temporarily storing section remaining payload count 37 is 0, and no payload data can be stored in the transmission payload temporarily storing section 14, the flow advances to step S2 to DMA-read only a payload corresponding to one cell.

If the cell formation/transmission control section 6 determines in step S15 that a continuous DMA transfer of payloads corresponding to a plurality of cells is performed, the section 6 notifies the host bus interface section 5 of the DMA read address and the DMA read data length through a DMA start request signal line 21, and outputs an instruction to DMA-read the transmission payloads from a host memory 3.

As the DMA read address, the host memory payload storage address 33 stored in the transmission parameter storage section 7 is notified. As the DMA read data length, the number obtained by adding one to the value stored in the temporarily storing section remaining payload count 37 is sent to the host bus interface section 5.

In addition, to designate a storage area for the DMA-read payloads, the cell formation/transmission control section 6 notifies the buffer control section 42 of the payload storage pointer 61 through the buffer control information signal line 43. The cell formation/transmission control section 6 notifies first and second selectors 15 and 16, through select information signal line 23 and select information signal line 24, of information as a command indicating that payloads corresponding to a plurality of cells are to be currently transferred.

The first and second selectors 15 and 16 directly send the first 1-cell payload of the DMA-read transmission payloads to a transmission cell formation section 9 by selecting a path avoiding the buffer control section 42.

For the remaining payloads, the first selector 15 switches its output to a path enroute to the buffer control section 42 to store the payloads in the RAM 41 in the transmission payload temporarily storing section 14 through buffer control section 42. At this time, the buffer control section 42 sequentially stores the payloads in the payload storage block chain starting from the address designated by the payload storage pointer 61 (step S16).

In step S2, as in the prior art, a payload corresponding to one cell is DMA-read. In this case, the cell formation/transmission control section 6 issues commands for bypassing the buffer control section 42 to the first and second selectors 15 and 16 in the transmission payload temporarily storing section 14 through the select information signal line 23 and the select information signal line 24, thereby directly sending the payload to the transmission cell formation section 9.

If the cell formation/transmission control section 6 determines in step S12 that a payload corresponding one cell is to be read out from the transmission payload temporarily storing section 14 and transmitted, the section 6 notifies the buffer control section 42 of the payload storage pointer 61.

With this operation, the buffer control section 42 reads out the 1-cell payload from the payload storage block at the start of the payload storage block chain designated by the payload storage pointer 61. At the same time, the cell formation/transmission control section 6 issues a command to the second selector 16 through the select information signal line 24 to switch the input to the buffer control section 42 side, thereby sending the 1-cell payload from the transmission payload temporarily storing section 14 to the transmission cell formation section 9.

The 1-cell payload storage block at the start, which has become unnecessary upon the read, is logically linked to the end of the idle payload storage block chain 53. As a result, the block is released.

Subsequently, the cell formation/transmission control section 6 subtracts one from the temporarily storing section remaining payload count 37 stored in the transmission parameter storage section 7 (step S17).

The transmission payload sent to the transmission cell formation section 9, the cell header information 31, and the cell trailer information 32 are formed into a transmission cell to be stored in the transmission data FIFO 10. This cell is sent to the physical layer device through the physical layer device interface section 11 (step S3).

In the second embodiment, only an area of the RAM 41 which corresponds to the payload to be DMA-read from the host memory 3 is ensured, and the area is released when it becomes unnecessary. The second embodiment therefore has the effect of effectively using the storage area of the transmission payload temporarily storing section 14, in addition to the effects of the first embodiment described above.

The third embodiment of the present invention will be described next.

The third embodiment of the present invention differs from the second embodiment in FIG. 7 in the arrangement of the contents of a transmission parameter storage section 7. Since the remaining arrangements of the third embodiment are the same as those of the second embodiment, a description thereof will be omitted.

Figure 11:
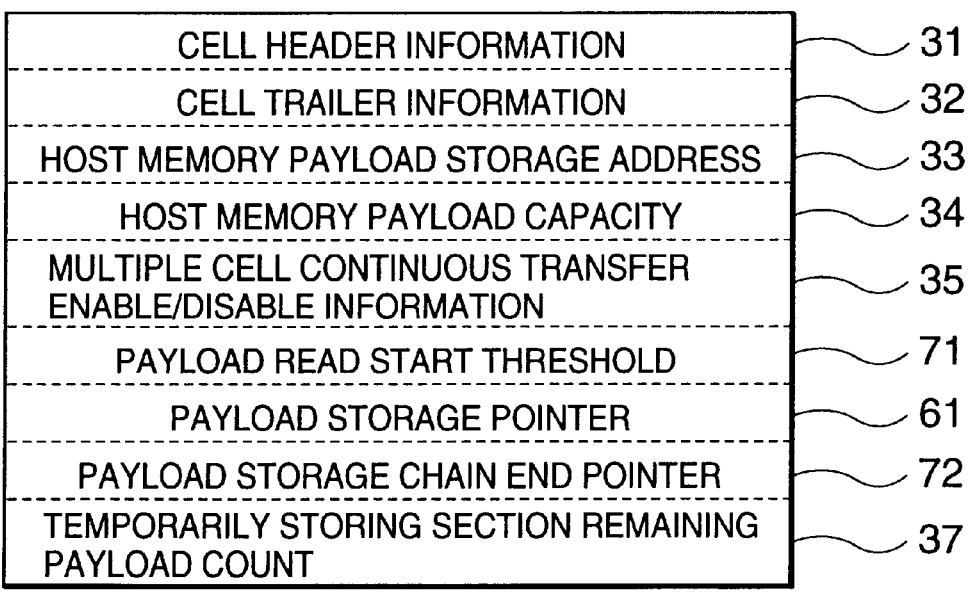
FIG. 11 is a view showing the format of a transmission parameter storage section according to the third embodiment of the present invention.

FIG. 11 shows the arrangement of the contents of the transmission parameter storage section 7 in the third embodiment of the present invention.

Similar to the transmission parameter storage section 7 in the second embodiment shown in FIG. 10, with respect to one VC, the transmission parameter storage section 7 in the third embodiment stores cell header information 31, cell trailer information 32, a host memory payload storage address 33, a host memory payload capacity 34, multiple cell continuous transfer enable/disable information 35, a temporarily storing section remaining payload count 37, and a payload storage pointer 61.

In addition to the above pieces of information, the transmission parameter storage section 7 in the third embodiment stores a payload read start threshold 71 as a reference value. When the number of payloads left in the transmission payload temporarily storing section 14 is equal to or smaller than a predetermined value as the reference value, a new payload can be DMA-read from the host memory 3, even if the payload read start threshold 71 is not 0. This payload read start threshold 71 is set by a host CPU 2.

The transmission parameter storage section 7 further stores a payload storage chain end pointer 72 for storing the start address of the final payload storage block of the payload storage block chain for the VC.

Figure 12:
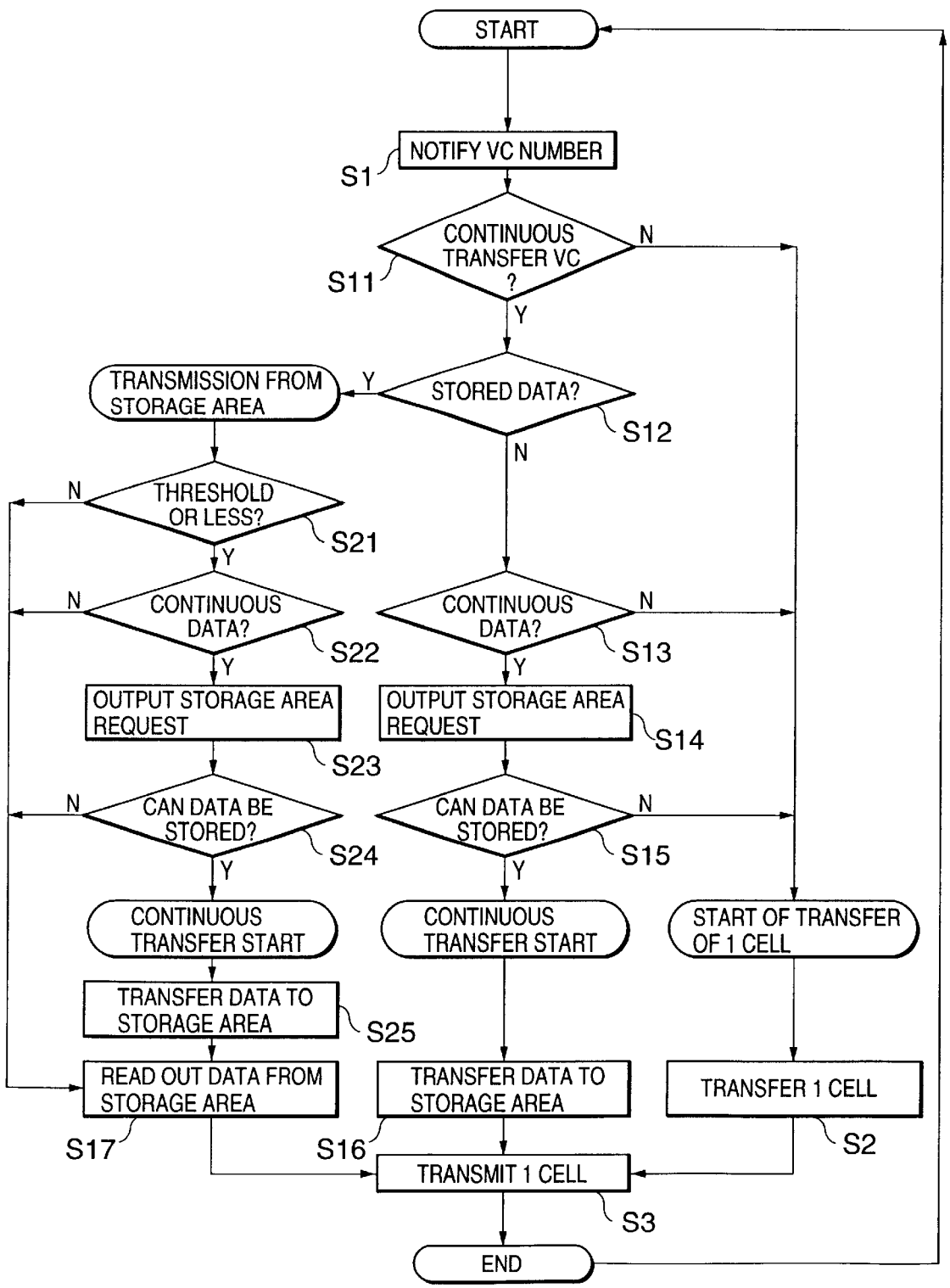
FIG. 12 is a flow chart showing the operation of the third embodiment of the present invention.

FIG. 12 is a flow chart showing the operation of the third embodiment of the present invention. The operation of the third embodiment of the present invention will be described in detail with reference to FIG. 12, together with FIGS. 7 and 11. The third embodiment differs from the second embodiment in the operation between step S12 to step S17. More specifically, the third embodiment additionally performs the following operation. In reading out and transmitting a payload from the transmission payload temporarily storing section 14, even if the number of payloads left in the transmission payload temporarily storing section 14 is not 0, the payload is DMA-read from the host memory 3 and added as a temporarily stored payload if the number of payloads is equal to or smaller than a predetermined value. Since other operations are the same as those in the second embodiment, a description thereof will be omitted.

In the third embodiment, if a cell formation/transmission control section 6 looks up the temporarily storing section remaining payload count 37 stored in the transmission parameter storage section 7 and determines in step S12 that payloads are stored, the cell formation/transmission control section 6 selects the operation of reading out and transmitting a payload corresponding to one cell from the transmission payload temporarily storing section 14. The flow advances to step S21.

In step S21, the cell formation/transmission control section 6 compares the payload read start threshold 71 stored in the transmission parameter storage section 7 with the temporarily storing section remaining payload count 37. If the cell formation/transmission control section 6 determines that the temporarily storing section remaining payload count 37 is larger than the payload read start threshold 71, the flow advances to step S17 to read out a payload corresponding to one cell from the transmission payload temporarily storing section 14 and transmit it without adding any payload thereto.

If the temporarily storing section remaining payload count 37 is equal to or smaller than the payload read start threshold 71, the flow advances to step S22 to add a payload (step S21 "EQUAL TO OR SMALLER THAN THRESHOLD?").

If the cell formation/transmission control section 6 determines in step S21 that a payload is to be added, the section 6 looks up the host memory payload capacity 34 stored in the transmission parameter storage section to check how many payloads for the VC can be DMA-read altogether, i.e., how many cells to which payloads that can be DMA-read correspond. If payload data corresponding to one cell (48 bytes) or more is not stored in a continuous address area in the host memory 3, the flow advances to step S17 to read out a payload corresponding to one cell from the transmission payload temporarily storing section 14 and transmit it without adding any payload thereto.

If continuous payload data corresponding to one cell (48 bytes) or more is present in the continuous address area in the host memory 3, and payloads corresponding to a plurality of cells can be DMA-read in one bus cycle, the flow advances to step S23 to DMA-read the payloads and add/store them in the transmission payload temporarily storing section 14 (step S22 "CONTINUOUS DATA?").

If the cell formation/transmission control section 6 determines in step S22 that payloads are added/stored in the transmission payload temporarily storing section 14, the section 6 notifies a buffer control section 42 of the number of cells to which payloads that can be continuously DMA-read correspond, determined in step S22, through a buffer control information signal line 43, and outputs a payload storage block add request. In addition, the cell formation/transmission control section 6 notifies the buffer control section 42 of the payload storage chain end pointer 72 through the buffer control information signal line 43.

Upon reception of this request, the buffer control section 42 extracts idle payload storage blocks 51 corresponding to the requested number of cells from the start of an idle payload storage block chain 53, and links the blocks to the end of the payload storage block chain for the VC.

Upon completion of linking, the buffer control section 42 notifies the cell formation/transmission control section 6 of the number of storage blocks extracted in this operation and the start address of the payload storage block at the end of the payload storage block chain through the buffer control information signal line 43.

If the number of idle payload storage blocks is smaller than the requested number, and all blocks corresponding to the requested number cannot be prepared as payload storage blocks for the VC, the number of blocks that can be prepared as payload storage blocks is notified. If no payload storage block can be prepared, "0" is notified as the number of payload storage blocks.

The cell formation/transmission control section 6 adds the notified number of payload storage blocks to the temporarily storing section remaining payload count 37, and stores the start address of the payload storage block at the end of the payload storage block chain as the payload storage chain end pointer 72.

A case wherein the RAM 41 has the arrangement shown in FIG. 9 in the third embodiment will be described in detail below with reference to FIG. 9, together with FIGS. 7, 11, and 12.

The payload storage chain end pointer 72 indicates the start address of a VC 1 payload storage block (4) 55d. The buffer control section 42 recognizes the final payload storage block of a current VC 1 payload storage block chain 57 as the VC 1 payload storage block (4) 55d. As a result, the buffer control section 42 replaces a hop destination address (4) 56d in the VC 1 payload storage block (4) 55d with a current idle payload storage block chain start address 54.

In this case, if a payload storage block corresponding to one cell is requested from the cell formation/transmission control section 6, the buffer control section 42 replaces the current idle payload storage block chain start address 54 with the address indicated by a hop destination address (5) 52e in an idle payload storage block (5) 51e. With this operation, the idle payload storage block (5) 51e is extracted from the idled payload storage block chain and additionally linked to the VC 1 payload storage block chain 57.

Finally, the buffer control section 42 notifies the cell formation/transmission control section 6 of the start address of the idle payload storage block (5) 51e that has become the payload storage block at the end of the VC 1 payload storage block chain 57 through the buffer control information signal line 43.

Upon reception of this notification, the cell formation/transmission control section 6 stores the start address of the idle payload storage block (5) 51e as a new payload storage chain end pointer 72 (step S23 "OUTPUT STORAGE AREA REQUEST").

If the number of payload storage blocks newly ensured in step S23 is 0, the flow advances to step S17 to read out 1-cell payload data of the payloads currently stored in the transmission payload temporarily storing section 14 and transmit it without adding/storing any payload.

When payload storage blocks corresponding to one or more cells are ensured, the flow advances to step S25 to DMA-read payloads from the host memory 3 and adds/stores them in the transmission payload temporarily storing section 14 (step S24 "CAN PAYLOADS BE STORED?").

If the cell formation/transmission control section 6 determines in step S24 that a DMA transfer of payloads is performed, the section 6 notifies a host bus interface section 5 of the DMA read address and the DMA read data length through a DMA start request signal line 21, and outputs an instruction to DMA-read transmission payloads from the host memory 3.

As the DMA read address, the host memory payload storage address 33 stored in a transmission schedule section 8 is notified. As the DMA read data length, the number of payload storage blocks newly ensured in step S23 is sent to the host bus interface section 5.

The cell formation/transmission control section 6 notifies a first selector 15, through a select information signal line 23, of information, as a command, which indicates that the current transfer is to be performed to add payloads to the transmission payload temporarily storing section 14. The first selector 15 switches its output to a path enroute to the buffer control section 42 to store the payloads in the RAM 41 in the transmission payload temporarily storing section 14 through the buffer control section 42.

At this time, the idle payload storage block chain start address 54 before replacement in step S23 is temporarily stored in the buffer control section 42, and the payloads are sequentially stored in the payload storage block chain starting from this address (step S25 "TRANSFER PAYLOADS TO STORAGE AREA").

Referring to FIG. 12, the processing in steps S25 and S17 is sequentially executed. If, however, a dual-port RAM capable of simultaneous read and write is used as the RAM 41, and read and write circuits for the RAM 41 are arranged in the buffer control section 42 to be independently operated, steps S25 and S17 can be concurrently executed. This arrangement is also incorporated in the present invention.

The ATM communication apparatus according to the third embodiment has the following effect in addition to the effects of the second embodiment. Since payloads are always stored in the transmission payload temporarily storing section 14, payloads can always be read out and transmitted internally except for the first cell for a VC. For this reason, delays in cell transmission can be reduced with respect to all the cells except for the first cell.

What is claimed is:

1. An ATM communications method, comprising:
    a) determining whether a cell is to be transmitted in a next transmission frame;
    b) if the determining in step a) is yes, notifying a cell formation section of a virtual channel (VC) number indicating a particular virtual channel through which the cell is to be transmitted;
    c) determining whether multiple payloads are to be continuously transferred to the particular virtual channel;
    d) if the determining in step c) is yes, checking whether transmission payloads for the particular virtual channel are currently stored in one of a plurality of FIFOs that are available for temporarily storing data, the one of the plurality of FIFOs being dedicated to storing data for the particular virtual channel and no other virtual channel;
    e) if the checking in step d) is such that the transmission payloads are currently stored in the one of the plurality of FIFOs, transmitting the transmission payloads, one cell at a time, from the one of the plurality of FIFOs to a transmission cell formation section for outputting the transmission payloads to an ATM network;
    f) if the checking in step d) is such that no transmission payloads are currently stored in the one of the plurality of FIFOs, determining a host memory capacity for continuously reading out a plurality of payloads from a host memory in which payloads corresponding to cells are stored in a continuous memory area in the host memory;
    g) based on the host memory capacity, determining if a sufficient available memory region in the one of the plurality of FIFOs exists for receiving the plurality of payloads read out from the host memory;
    h) if the determining in step g) is that the sufficient memory region exists, continuously transferring the payloads corresponding to the plurality of cells from the host memory in a DMA-manner to the one of the plurality of FIFOs; and i) transmitting the payloads corresponding to the cells for the particular virtual channel one cell at a time, to the transmission cell formation section for outputting the transmission cells.

2. An ATM communications apparatus, comprising:

a transmission schedule section that determines a cell that is to be transmitted in a next transmission frame and a particular virtual channel through which the cell is to be transmitted;

a plurality of payload FIFOs for temporarily storing payloads received from a host memory, the plurality of payload FIFOs being assigned to a plurality of virtual channels on a one-to-one basis, one of the plurality of payload FIFOs being assigned to the particular virtual channel;

a transmission cell formation section for forming and outputting an output cell to an ATM network;

a first selector provided between the plurality of payload FIFOs and the host memory, for selecting which of the plurality of FIFOs to receive data output from the host memory;

a second selector provided between the plurality of payload FIFOs and the transmission cell formation section for providing output from which of the plurality of FIFOs to the transmission cell formation section;

a transmission parameter section that stores cell header information, cell trailer information, payload storage address in the host memory, payload capacity in a host memory, multiple cell continuous transfer enable/disable information indicating whether or not a host CPU is to transfer transmission payloads corresponding to a plurality of cells from the host memory to the particular virtual channel at once, a payload FIFO number indicating the one of the plurality of FIFOs allocated to the particular virtual channel, and a temporarily storing section remaining payload count indicating a number of cells corresponding to payloads currently stored in the one of the plurality of FIFOs;

a cell formation/transmission control section that is configured to receive information output by the transmission schedule section and the transmission parameter storage section, wherein the cell formation/transmission control section sends control signals to the first and second selectors based on the information received, wherein the cell formation/transmission control section is configured to:

determine that when multiple payloads are to be continuously transferred to the particular virtual channel based on the multiple cell continuous transfer enable/disable information for the particular virtual channel, and check whether there are any transmission payloads for the particular virtual channel that are currently stored in the one of a plurality of FIFOs that is dedicated to storing data for the particular virtual channel and no other virtual channel, and if there are any transmission payloads for the particular virtual channel that are currently stored in the one of the plurality of FIFOs, transmitting them out one at a time via the second selector to the transmission cell formation section, and wherein, when there are no transmission payloads for the particular virtual channel that are currently stored in the one of the plurality of FIFOs, the cell formation/transmission control section checks the multiple cell continuous transfer enable/disable information for the particular virtual channel to determine if more than one cell can be transferred continuously, in a DMA manner, from the host memory to the one of the plurality of FIFOs, and if so, the cell formation/transmission control provides control for enabling the continuous transfer and outputting of one cell at a time from the one of the plurality of FIFOs to the transmission data FIFO, by outputting a first cell from the host memory directly to the transmission cell formation section by selecting the first and second selectors to perform a bypass of the plurality of FIFOs, and by storing succeeding second and further cells obtained in the DMA manner from the host memory in the one of the plurality of FIFOs, to be output thereafter to the transmission cell formation section.

3. An ATM communications method, comprising:

a) determining whether a cell is to be transmitted in a next transmission frame;

b) if the determining in step a) is yes, notifying a cell formation section of a virtual channel (VC) number indicating a particular virtual channel through which the cell is to be transmitted;

c) determining whether multiple payloads are to be continuously transferred to the particular virtual channel;

d) if the determining in step c) is yes, checking whether transmission payloads for the particular virtual channel are currently stored in assigned payload storage blocks of a random access memory that are available for temporarily storing data;

e) if the checking in step d) is such that the transmission payloads are currently stored in the assigned payload storage blocks of the random access memory, transmitting the transmission payloads, one cell at a time, sequentially from the assigned payload storage blocks of the random access memory to a transmission cell formation section for outputting the transmission payloads to an ATM network, wherein each of the assigned payload storage blocks includes a forward link address to a different one of the assigned payload storage blocks that contains a next transmission payload to be transmitted;

f) if the checking in step d) is such that no transmission payloads are currently stored in the assigned payload storage blocks of the random access memory, determining a host memory capacity for continuously reading out a plurality of payloads from a host memory in which payloads corresponding to cells are stored in a continuous memory area in the host memory;

g) based on the host memory capacity, determining if a sufficient available memory region in the idle payload storage blocks of the random access memory exists for receiving the plurality of cells read out from the host memory;

h) if the determining in step g) is that the sufficient memory region exists, continuously transferring the payloads corresponding to the plurality of cells from the host memory in a DMA-manner to the assigned payload storage blocks of the random access memory; and i) transmitting the payloads corresponding to the cells for the particular virtual channel, one cell at a time, to the transmission cell formation section for outputting the transmission cells.

4. An ATM communications apparatus, comprising:

a transmission schedule section that determines a cell that is to be transmitted in a next transmission frame and a particular virtual channel through which the cell is to be transmitted;

a random access memory including a plurality of payload storage blocks for temporarily storing payloads received from a host memory;

a buffer control section for buffering payloads to be stored in said random access memory;

a transmission cell formation section for forming and outputting an output cell to an ATM network;

a first selector provided between the buffer control section and the host memory, for selecting either said buffer control circuit or and a second selector as an output section of payloads transferred from said host memory;

said second selector provided between the buffer control section and the transmission cell formation section, for providing output from one of said first selector and said buffer control section to the transmission cell formation section, wherein said buffer control section maintains information corresponding to a number of idle payload storage blocks in said random access memory, wherein, when a plurality of transmission payloads are to be read into said random access memory as output from said host memory to be output on a particular virtual channel, said buffer control section determines a plurality of said idle payload storage blocks, as a plurality of assigned payload storage blocks, in which to store said plurality of transmission payloads, wherein each of said plurality of assigned payload storage blocks includes a forward link address to a next one of said plurality of assigned payload storage blocks that stores a different one of said plurality of transmission payloads to be output on said particular virtual channel, and wherein said plurality of transmission payloads to be output on said particular virtual channel are output from said random access memory in sequential order, based on said buffer control section reading data from said random access memory starting at a first of said assigned payload storage blocks, moving to a second of said assigned payload storage blocks based on said forward link address in said first of said assigned payload storage blocks, and finally moving to a last of said assigned payload storage blocks based on a forward link address in a next-to-last of said assigned payload storage blocks.

5. An apparatus according to claim 4, wherein said buffer control section includes a counter for managing a current number of idle payload storage blocks in said random access memory.

* * * * *